United States Patent Office 3,301,841
Patented Jan. 31, 1967

3,301,841
SULFONYL AND PHOSPHONYL AZIDES AS
POLYMERIZATION INITIATORS
John E. Burleigh and Carl A. Uraneck, Bartlesville, Okla., assignors to Phillips Petroleum Company, a corporation of Delaware
No Drawing. Filed July 11, 1963, Ser. No. 294,233
11 Claims. (Cl. 260—94.4)

This invention relates to a process for the polymerization of unsaturated organic compounds. In one aspect the invention relates to the polymerization of conjugated dienes. In another aspect the invention relates to a novel initiator for the polymerization of unsaturated organic compounds, particularly conjugated dienes.

It is known that unsaturated organic compounds, such as conjugated dienes, can be polymerized either alone, with each other, or with other copolymerizable monomers to form polymeric materials having more or less rubbery properties depending upon the monomers. Polymerization can be effected in bulk, solution, or emulsion systems. For purposes of simplicity, this invention will be described with reference to the employment of an aqueous emulsion polymerization system, although the initiators of the invention can also be employed in non-aqueous systems including solution systems.

It is an object of the invention to provide a method for preparing polymers of unsaturated organic compounds.

It is yet another object of the invention to provide a novel polymerization initiator.

Yet another object of the invention is to provide an initiator for the aqueous emulsion polymerization of conjugated dienes.

These and other objects of the invention will be readily apparent to those skilled in the art from the accompanying disclosure and appended claims.

It has now been found that organic sulfonyl and phosphonyl azides are effective as initiators for the polymerization of unsaturated organic compounds, particularly conjugated dienes. These organic sulfonyl and phosphonyl azides are best represented by the formulae

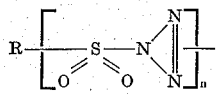

and

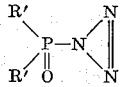

wherein R is a saturated aliphatic, saturated cycloaliphatic, or an aromatic radical, R' is an aromatic radical, and $n$ is an integer that can be 1 or 2. The aromatic radicals include phenyl, naphthyl and biphenylyl radicals. The R and R' groups can contain hydrocarbon substituents or other substituents inert under the reaction conditions, e.g., —OR and —SR groups. Preferred substituents include methyl, ethyl, methoxy, ethoxy, methylthio, and ethylthio groups but it is understood that the substituents can contain a greater number of carbon atoms. The number of carbon atoms in each R and R' group is in the range of 1 to 20, 6 to 20 when the radical is aromatic.

Illustrative of the organic sulfonyl and phosphonyl azides that are applicable as polymerization initiators are the following: methanesulfonyl azide, ethanesulfonyl azide, decanesulfonyl azide, eicosanesulfonyl azide, 3-phenylpropanesulfonyl azide, 4-methoxybutanesulfonyl azide, 6-ethoxyhexanesulfonyl azide, 3,5-dimethylheptanesulfonyl azide, cyclopentanesulfonyl azide, hexane-1,6-di(sulfonyl azide), 3-methylcyclopentanesulfonyl azide, 3,4-di(methylthio)cyclopentanesulfonyl azide, cyclohexanesulfonyl azide, 4-methylcyclohexanesulfonyl azide, 4-ethylthiocyclohexanesulfonyl azide, cyclopentane-1,3-di(sulfonyl azide), benzene-1,4-di(sulfonyl azide), 2-ethylbenzene-1,4-di(sulfonyl azide), biphenyl-4,4'-di(sulfonyl azide), naphthalene-2-sulfonyl azide, naphthalene-1,4-di(sulfonyl azide), diphenylphosphonyl azide, di-1-naphthylphosphonyl azide, di(4-biphenylyl)-phosphonyl azide, di(4-tolyl)-phosphonyl azide, di(3,5-dimethoxyphenyl)phosphonyl azide and the like.

The monomeric material polymerized in accordance with the process of this invention comprises ethylenically unsaturated organic compounds which contain the characteristic structure $CH_2=C<$ and, in most cases, have at least one of the disconnected valences attached to an electronegative group, that is, a group which increases the polar character of the molecule, such as a chlorine group or an organic group containing a double or triple bond such as vinyl, phenyl, cyano, carboxy, or the like. Included in this class of monomers are the conjugated dienes such as 1,3-butadiene, 2,3-dimethyl-1,3-butadiene, isoprene, piperylene, 3-furyl-1,3-butadiene, 3-methoxy-1,3-butadiene, and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, 4-chlorostyrene, 4-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alphachloroacrylate, methy methacrylate, ethyl methacrylate, butyl methacrylate, methyl ethacrylate, acrylonitrile, methacrylonitrile, methacrylamide, and the like; methyl isopropenyl ketone, methyl vinyl ketone, methyl vinyl ether, vinyl acetate, vinyl chloride, vinylidene chloride, vinylfuran, vinylcarbazole, vinylacetylene and other unsaturated hydrocarbons, esters, alcohols, acids, ethers, etc., of the types described.

Our process is particularly effective when the monomeric material polymerized is a polymerizable aliphatic conjugated diolefin having 4 to 12 carbon atoms per molecule or a mixture of such a conjugated diolefin with lesser amounts of one or more other compounds containing an active $CH_2=C<$ group which are copolymerizable therewith, such as aryl olefins, acrylic and substituted acrylic acids, esters, nitriles and amides, methyl isopropenyl ketone, vinyl chloride, and similar compounds mentioned hereinabove. In this case the products of the polymerization can be high molecular weight polymers and copolymers which are rubbery in character and may be called synthetic rubber. Although, as can be readily deduced from the foregoing, there is a host of possible reactants. The invention will be more particularly discussed and exemplified by use of 1,3-butadiene.

When employing an aqueous emulsion system, it is generally preferred that the emulsion be of an "oil-in-water" type, with the ratio of aqueous medium to monomeric material between about 0.15 : 1 and about 2.75 : 1, in parts by weight.

It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase.

The polymerization temperatures are generally within the limits of −40° and 160° F. with temperatures in the range of 0 to 140° F. being preferred. Total pressure on the reactants is preferably at least as great as the total vapor pressure of the mixture so that the initial reactants will be present in the liquid phase.

While the initiators hereinbefore described are employable by themselves as initiators for the polymerization of conjugated dienes and the like, it is preferred that a complexing and/or chelating agent be included in the polymerization recipe. These complexing and/or chelating agents (referred to herein generally as complexing agents) are well known in the art and include ethylenediamine tetraacetic acid and its alkali metal and ammonium salts, alkali metal and ammonium citrates, tartrates and polyphosphates, and 2,2′-dipyridyl.

It has also been found that it is preferred to employ a soluble heavy metal salt in conjunction with the initiator and/or the complexing agent. These soluble heavy metal salts are preferably soluble salts of iron, cobalt, nickel, vanadium and chromium, for example, chlorides, sulfates, nitrates and the like.

The amount of organic sulfonyl or phosphonyl azide initiator charged to a polymerization system is variable over broad operating conditions but is generally in the range of 0.5 to 15 millimoles, preferably in the range of 1 to 10 millimoles, per 100 grams of monomers. The mole ratio of azide to heavy metal salt is generally in the range of 0.5:1 to 20:1, preferably 1:1 to 5:1. The amount of complexing agent and/or chelating agent utilized is related to the heavy metal salt and depends upon its ability to complex with the metal. In most instances, from 1 to 5 moles of the agent is employed per mole of heavy metal salt.

It has also been found that modifiers can be employed in conjunction with these initiators and in some instances the polymerization conversion rate can be increased by the employment of said modifiers or chain transfer agents. These modifiers or chain transfer agents also assist in the production of a more plastic workable soluble polymer. Any of the well-known modifiers are applicable hereto including alkyl mercaptans, such as normal dodecyl and tetradecyl mercaptans, isopropylxanthogen disulfide, alphathionaphthol, p-alkylphenoxymonomercaptodiethylene glycol, 2 - mercapto-4-phenylthiazole, di(4-phenylthiazolyl - 2) disulfide, polyhalogenated hydrocarbons, such as bromoform, and carbon tetrabromide and the like.

The initiator systems are employable in either batch or continuous operations. The order of addition of the initiator, complexing and/or chelating agent, heavy metal salt and monomer is not critical and any convenient order may be employed. A suitable order includes (1) adding into the polymerization zone the soluble heavy metal salt, the complexing agent, and the soap, (2) then adding the monomer, (3) then adding the other ingredients of the polymerization recipe and (4) thereafter adding the azide last, either by itself or in an inert diluent or in the monomer if it is soluble therein.

The polymers in accordance with the present process can range from plastic to rubbery materials, depending upon the monomers used in their preparation. Rubbery polymers can be compounded by the various methods that have been used in the past in compounding natural and synthetic rubbers. Vulcanization accelerators, vulcanizing agents, reinforcing agents, softeners, extenders, antioxidants and fillers such as have been employed in natural and synthetic rubbers can likewise be used in compounding the rubbers of this invention. It is also within the scope of the invention to blend the polymers with other polymeric materials, such as natural rubber, cis-polybutadiene, cis-polyisoprene, polyethylene, ethylenepropylene rubber, and the like. In general, the polymers have utility where natural and synthetic rubbers are used. They are particularly useful in the manufacture of automobile and truck tires and other rubbery articles such as hose, gaskets, and the like.

The invention is best described by the following specific examples.

Example I

A series of emulsion polymerization runs was made for the polymerization of butadiene in which the initator was cyclopentanesulfonyl azide. Table I gives a summary of the runs. Quantities of materials used are expressed as parts by weight.

TABLE I

|  | 1 | 2 | 3 | 4 | 5 |
|---|---|---|---|---|---|
| 1,3-butadiene | 100 | 100 | 100 | 100 | 100 |
| Water | 180 | 180 | 180 | 180 | 180 |
| Potassium fatty acid soap | 4.6 | 4.6 | 4.6 | 4.6 | 4.6 |
| KOH | 0.03 | 0.03 | 0.03 | 0.03 | 0.03 |
| KCl | 0.30 | 0.30 | 0.30 | 0.30 | 0.30 |
| Tamol N [1] | 0.20 | 0.20 | 0.20 | 0.20 | 0.20 |
| Questex 4SW [2] (in soap soln.) | 0.017 | 0.017 | 0.017 | 0.017 | 0.017 |
| Questex 4SW [2] (in activator) | 1.63 |  | 1.63 | 0.163 | 0.163 |
| FeSO$_4$.7H$_2$O | 0.50 |  | 0.50 | 0.05 | 0.05 |
| Cyclopentanesulfonyl azide, phm.[3] |  | 0.5 | 0.5 |  | 0.5 |
| Total Questex 4SW, mmoles | 3.6 | 0.038 | 3.6 | 0.39 | 0.39 |
| FeSO$_4$.7H$_2$O, mmoles | 1.8 |  | 1.8 | 0.18 | 0.18 |
| Cyclopentanesulfonyl azide mmoles |  | 2.86 | 2.86 |  | 2.86 |
| Mole ratios: |  |  |  |  |  |
| Azide:metal salt |  |  | 1.6:1 |  | 16:1 |
| Questex:metal salt | 2:1 |  | 2:1 | 2:1 | 2:1 |
| Temperature, ° F | 122 | 122 | 122 | 122 | 122 |
| Time, hours | 16.8 | 16.8 | 16.8 | 24.0 | 24.0 |
| Conversion, percent | 9.3 | 33.7 | 69.3 | 6.3 | 57.3 |

[1] Sodium salt of a naphthalene sulfonic acid condensed with formaldehyde.
[2] Tetrasodium salt of ethylenediamine tetraacetic acid, EDTA.Na$_4$·4H$_2$O.
[3] Parts by weight per 100 parts monomer.

In each run the polymer was coagulated with isopropyl alcohol containing di-tert-butylhydroquinone. Reference to the first three runs shows that the highest conversion was obtained in Run 3. This system contained the azide, complexing agent (Questex 4SW) and heavy metal salt (FeSO$_4$·H$_2$O). The azide was not present in Run 1 and the conversion was low. Runs 4 and 5 with and without the azide, show that good results can be obtained when operating in accordance with the preferred method of the invention even though the amounts of complexing agent and heavy metal salt are greatly reduced.

Example II

Variable amounts of diphenylphosphonyl azide were employed as the initiator in a series of runs for the polymerization of butadiene in aqueous emulsion. A complexing agent (Questex 4SW) and a heavy metal salt (FeSO·7H$_2$O) were present in each run. In one run, tert-dodecyl mercaptan was added as a modifier. The data are presented in Table II. Quanities of materials used are expressed as parts by weight.

TABLE II

|  | 1 | 2 | 3 | 4 | 5 |
|---|---|---|---|---|---|
| 1,3-butadiene | 100 | 100 | 100 | 100 | 100 |
| Water | 180 | 180 | 180 | 180 | 180 |
| Potassium fatty acid soap | 4.5 | 4.5 | 4.5 | 4.5 | 4.5 |
| KOH | 0.03 | 0.03 | 0.03 | 0.03 | 0.03 |
| KCl | 0.30 | 0.30 | 0.30 | 0.30 | 0.30 |
| Tamol N | 0.20 | 0.20 | 0.20 | 0.20 | 0.20 |
| Questex 4SW (in soap soln.) | 0.017 | 0.017 | 0.017 | 0.017 | 0.017 |
| Questex 4SW (in activator) | 1.63 | 1.63 | 0.82 | 0.41 | 1.63 |
| FeSO$_4$.7H$_2$O | 0.50 | 0.50 | 0.25 | 0.13 | 0.50 |
| Diphenylphosphonyl azide, phm | 0.94 | 0.44 | 0.41 | 0.41 | 0.92 |
| Tertiary dodecyl mercaptan |  |  |  |  | 0.21 |
| Total Questex 4SW, mmoles | 3.6 | 3.6 | 1.8 | 0.94 | 3.6 |
| FeSO$_4$.7H$_2$O, mmoles | 1.8 | 1.8 | 0.9 | 0.47 | 1.8 |
| Diphenylphosphonyl azide, mmoles | 3.9 | 1.8 | 1.7 | 1.7 | 3.8 |
| Mole Ratios: |  |  |  |  |  |
| Azide:metal salt | 2.2:1 | 1:1 | 1.9:1 | 3.6:1 | 2.1:1 |
| Questex:metal salt | 2:1 | 2:1 | 2:1 | 2:1 | 2:1 |
| Temperature, ° F | 122 | 122 | 122 | 122 | 122 |
| Time, hours | 101.3 | 101.3 | 101.3 | 101.3 | 61.3 |
| Conversion, percent | 49.6 | 58.2 | 49.8 | 56.3 | 71.6 |

The presence of the mercaptan in Run 5 enhanced the conversion rate. A sample withdrawn after 24 hours (43 percent conversion) was gel free and had an inherent viscosity of 2.16.

While certain examples, structures, composition and process steps have been described for purposes of illustration, the invention is not limited to these. Variation and modification within the scope of the disclosure and the claims can readily be effected by those skilled in the art.

We claim:
1. A process for polymerizing an ethylenically unsaturated organic monomer containing a $CH_2=C<$ group comprising contacting said monomer under polymerization conditions in the presence of an initiator selected from the group consisting of organic sulfonyl and phosphonyl azides represented by the formulae

(1) 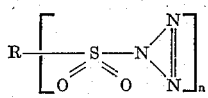

and (2) 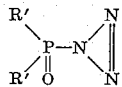

wherein R is selected from the group consisting of a saturated aliphatic, saturated cycloaliphatic and aromatic radicals, R' is an aromatic radical, R and R' each having from 1 to 20 carbon atoms per molecule, and $n$ is an integer from 1 to 2.

2. A process for polymerizing a conjugated diene comprising carrying out said polymerization in the presence of an initiator selected from the group consisting of organic sulfonyl and phosphonyl azides represented by the formulae (1) 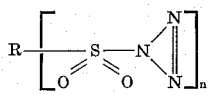

and (2) 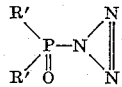

wherein R is selected from the group consisting of a saturated aliphatic, saturated cycloaliphatic and aromatic radicals, R' is an aromatic radical, said aromatic radicals being selected from the group consisting of phenyl, naphthyl and biphenylyl radicals, and derivatives thereof, R and R' each having from 1 to 20 carbon atoms per molecule, and $n$ is an integer from 1 to 2.

3. A process for polymerizing a conjugated diene comprising carrying out said polymerization in the presence of an initiator selected from the group consisting of organic sulfonyl and phosphonyl azides represented by the formulae (1) 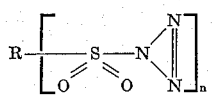

and (2) 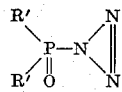

wherein R is selected from the group consisting of a saturated aliphatic, saturated cycloaliphatic and aromatic radicals, R' is an aromatic radical, said aromatic radicals being selected from the group consisting of phenyl, naphthyl and biphenylyl radicals and derivatives thereof, R and R' each having from 1 to 20 carbon atoms per molecule, and $n$ is an integer from 1 to 2, and in the presence of at least one complexing agent.

4. A process for polymerizing a conjugated diene comprising carrying out said polymerization in the presence of an initiator selected from the group consisting of organic sulfonyl and phosphonyl azides represented by the formulae (1) 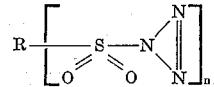

and (2) 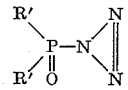

wherein R is selected from the group consisting of a saturated aliphatic, saturated cycloaliphatic and aromatic radicals, R' is an aromatic radical, said aromatic radicals being selected from the group consisting of phenyl, naphthyl and biphenylyl radicals and derivatives thereof, R and R' each having from 1 to 20 carbon atoms per molecule, and $n$ is an integer from 1 to 2, and in the presence of at least one complexing agent selected from the group consisting of ethylene diamine tetracetic acid, alkali metal salts of ethylene diamine tetracetic acid, ammonium salts of ethylene diamine tetracetic acid, alkali metal citrates, ammonium citrates, alkali metal tartrates, ammonium tartrates, alkali metal polyphosphates, ammonium polyphosphates, and 2,2'-dipyridyl, and in the presence of a soluble heavy metal salt selected from the group consisting of salts of iron, cobalt, nickel, chromium and vanadium.

5. The process of claim 4 wherein said polymerization takes place in the further presence of a chain transfer agent.

6. A process for polymerizing a conjugated diene in an aqueous emulsion polymerization process comprising contacting said conjugated diene under polymerization conditions at a temperature in the range of —40 to 160° F. in the presence of an initiator selected from the group consisting of organic sulfonyl and phosphonyl azides represented by the formulae (1) 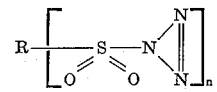

and (2) 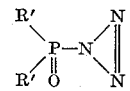

wherein R is selected from the group consisting of a saturated aliphatic, saturated cycloaliphatic and aromatic radicals, R' is an aromatic radical, said aromatic radicals being selected from the group consisting of phenyl, naphthyl and biphenylyl radicals and derivatives thereof, R and R' each having from 1 to 20 carbon atoms per molecule, and $n$ is an integer from 1 to 2, said polymerization also occurring in the presence of at least one complexing agent, and in the further presence of a soluble heavy metal salt selected from the group consisting of salts of iron, cobalt, nickel, chromium and vanadium, and recovering the resultant polymer, and said initiator being present in an amount in the range of 0.5 to 15 millimoles of initiator per 100 grams of monomer, the mole ratio of the azide to heavy metal salt being in the range of 0.5:1 to 20:1, the amount of the agent being in the range of 1 to 5 moles of the complexing agent per mole of the heavy metal salt.

7. A process for polymerizing 1,3-butadiene in an aqueous emulsion polymerization process comprising contacting said 1,3-butadiene under polymerization conditions and at a temperature in the range of —40 to 160° F. in the presence of cyclopentanesulfonyl azide, a tetrasodium salt ethylenediamine tetraacetic acid, and ferrous sulfate.

8. The process of claim 7 wherein said azide is present in an amount in the range of 0.5 to 15 millimoles of azide per 100 grams of 1,3-butadiene, the mole ratio of the azide to the ferrous sulfate is in the range of 0.5:1 to 20:1, and the amount of the tetrasodium salt of ethylenediamine tetraacetic acid being in the range of 1 to 5 moles per mole of ferrous sulfate.

9. A process of polymerizing 1,3-butadiene in an aqueous emulsion polymerization process comprising contacting said 1,3-butadiene under polymerization conditions and at a temperature in the range of −40 to 160° F. in the presence of diphenylphosphonyl azide, a tetrasodium salt of ethylenediamine tetraacetic acid and ferrous sulfate.

10. The proces of claim 9 wherein said azide is present in an amount in the range of 0.5 to 15 millimoles of azide per 100 grams of 1,3-butadiene, the mole ratio of the azide to the ferrous sulfate is in the range of 0.5:1 to 20:1, and the amount of the tetrasodium salt of ethylenediamine tetraacetic acid being in the range of 1 to 5 moles per mole of ferrous sulfate.

11. The process of claim 9 wherein said polymerization is conducted in the presence of tertiary dodecyl mercaptan.

References Cited by the Examiner
UNITED STATES PATENTS

| | | | |
|---|---|---|---|
| 3,058,944 | 10/1962 | Breslow et al. | 260—349 |
| 3,211,753 | 10/1965 | Paciorek et al. | 260—349 |
| 3,212,844 | 10/1965 | Washburn | 260—349 |

JOSEPH L. SCHOEFER, *Primary Examiner.*

H. I. CANTOR, *Assistant Examiner.*